United States Patent [19]
Lechner

[11] 3,866,486
[45] Feb. 18, 1975

[54] ONE-WAY ROTATION CONTROL FOR SYNCHRONOUS MOTOR SHAFTS

[75] Inventor: Walter L. Lechner, New Providence, N.J.

[73] Assignee: Engler Instrument Company, Jersey City, N.J.

[22] Filed: Oct. 9, 1973

[21] Appl. No.: 404,621

[52] U.S. Cl. .......................... 74/425, 74/435, 74/458
[51] Int. Cl. ........................ F16h 1/16, F16h 55/04
[58] Field of Search ...................... 74/425, 458, 435

[56] References Cited
UNITED STATES PATENTS
3,768,325  10/1973  Kucharski, Jr. ..................... 74/435

Primary Examiner—Leonard H. Gerin

[57] ABSTRACT

A drive means powered by a synchronous motor includes a gearing worm on the motor shaft meshing with a gear that is adapted to be drivingly connected to apparatus to be driven and said worm and said gear are specially constructed to coact with each other to block rotation of the shaft in one direction and to permit free rotation in the opposite direction.

8 Claims, 5 Drawing Figures

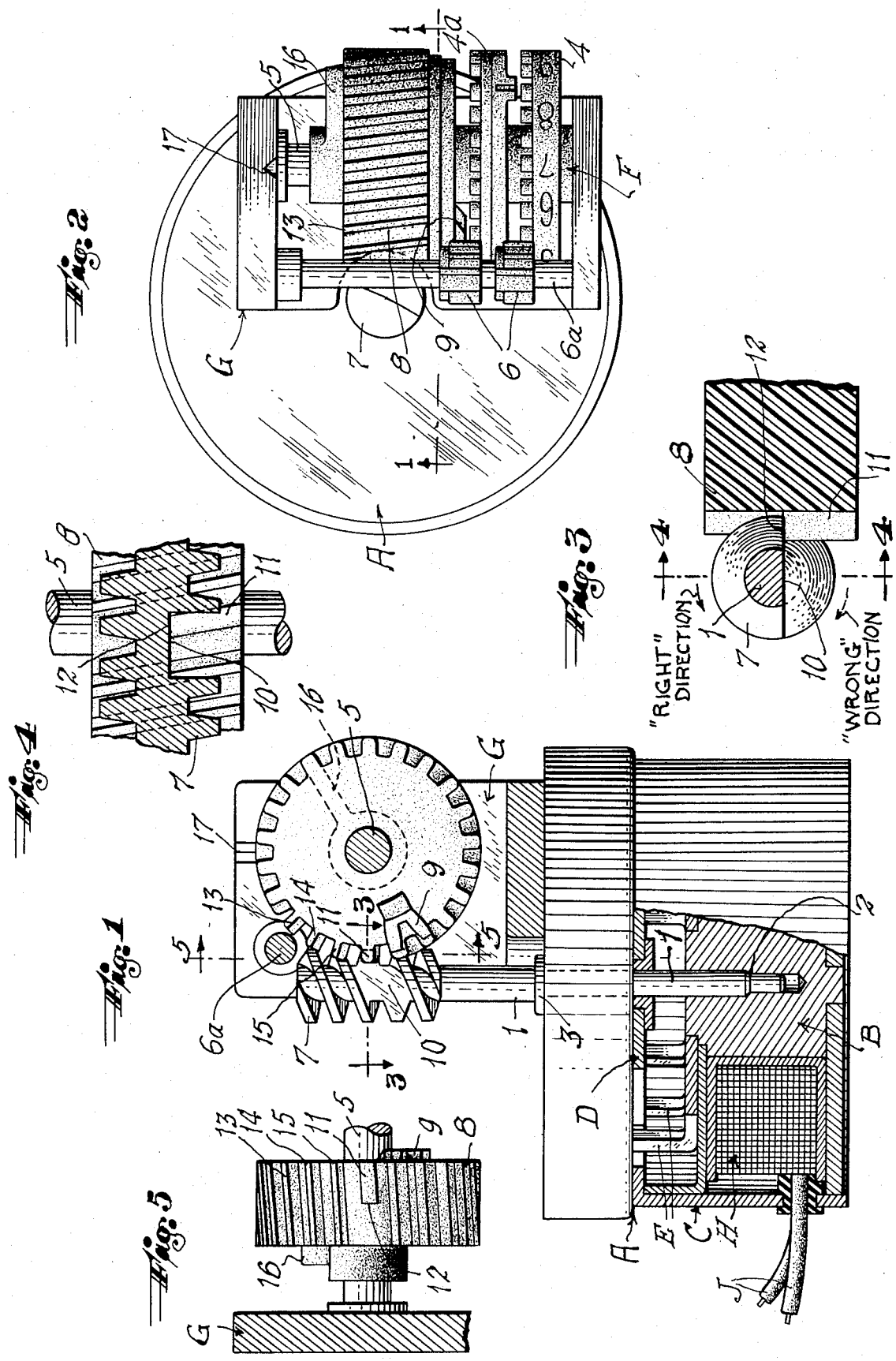

3,866,486

ONE-WAY ROTATION CONTROL FOR SYNCHRONOUS MOTOR SHAFTS

BACKGROUND OF THE INVENTION

This invention relates to means for controlling the rotation in one direction of the shaft of a synchronous motor particularly a motor of the self-starting type, and especially a self-starting synchronous motor having a permanent magnet rotor. A few of the many applications for synchronous motors are in drive means for elapsed time hour meters, record charts and timing switches.

The prior art includes one-way direction control devices for synchronous motors, for example, as exemplified by U.S. Pat. Nos. 2,436,231, 3,525,888 and 3,200,915. Some of the known devices include meshing spur gears that preferably are separate from the driving gear train and have their teeth modified such as to cause blocking of the motor shaft rotation when urged in the incorrect direction, while other devices include ratchets, or embody cam programming means on the shaft coacting with pawls mounted on the motor casing, and the like.

These prior art devices leave much to be desired in that either they cannot be relied upon to accomplish their intended purpose, or they are too complicated and include too many parts, or they are difficult and expensive to make, or they are subject to rapid wear and therefore are short-lived or they cause undesirable friction losses which require a motor having higher rated torque output than would be necessary to drive a particular device for example, an hour meter or a clock.

SUMMARY OF THE INVENTION

A primary object of the present invention is to provide a one-way direction control for synchronous motors which overcomes the objections to and disadvantages of the prior art devices, and which is reliable in operation, simple in construction and easy to produce comprising a minimum number of parts, which resists wear so as to be long-lived, and wherein friction losses are reduced to the minimum; and more particularly, the invention contemplates a synchronous motor powered drive means which includes a gearing worm on the motor shaft meshing with a gear adapted to have a driving connection with apparatus to be driven, and said worm and said gear are specially constructed to coact with each other to prevent rotation of the shaft in one direction for example, counter-clockwise, and to permit free rotation in the opposite direction, for example, clockwise.

More specifically the invention provides in drive means of the character described, a worm a portion of whose helical tooth is omitted or cut away to provide a flat surface intermediate the length of the worm, and the worm meshes with a spiral gear wherein the axial length of one tooth known hereafter as the stop tooth, is approximately one-half the axial length of the other teeth so that the worm may freely rotate in one direction to drive the gear in known manner, but when the worm is urged to rotate in the opposite direction said flat surface abuts the end surface of said stop tooth of the gear so as to block rotation of the shaft in the second-mentioned direction.

Preferably, also a plurality of teeth on the gear at one side of said stop tooth are narrower than the other teeth, providing lost-motion or back-lash between the worm and the gear to allow the end of the stop tooth to properly abut the flat surface on the worm.

BRIEF DESCRIPTION OF THE DRAWINGS

For a specific understanding of the invention, reference should be had to the following description in conjunction with the accompanying drawings in which FIG. 1 is a partially side elevational and partially sectional view on the plane of line 1—1 of FIG. 2 of a drive means embodying the invention;

FIG. 2 is a top plan view of the drive means;

FIG. 3 is a greatly enlarged fragmentary horizontal sectional view on the plane of line 3—3 of FIG. 1;

FIG. 4 is a fragmentary sectional view on the plane of line 4—4 of FIG. 3, and

FIG. 5 is a fragmentary front elevational view of the spiral gear from the plane of line 5—5 of FIG. 1, with the worm omitted.

DESCRIPTION OF THE PREFERRED EMBODIMENT

The one-way rotation control for motor shafts herein disclosed is adapted for use with any motor that has the characteristic that its rotor will run in either a clockwise or a counter-clockwise direction when current is applied, and the specific type and construction of the motor is immaterial. The power source may be either A.C. or D.C. and an example of a self-starting synchronous motor with an electronic control circuit is shown in the copending application of Ronald M. Graziano Ser. No. 404,174 which includes a bifilar wound coil, a stator, a shaft, a fly wheel, and a permanent magnet type rotor fastened to the shaft and magnetized with multiple poles on its circumference that are out of symmetry with the remaining poles so that the motor is self-starting and the rotor may rotate in either a clockwise or a counter-clockwise direction.

For the purpose of illustrating the principles of the present invention, the one-way rotation control of the invention is shown in conjunction with the self-starting synchronous motor described in U.S. Pat No. 2,436,231 and is generally designated by the reference character A.

The present invention insures that if the motor starts in the "wrong" or undesired direction, the rotation will be quickly blocked for rebound and continued rotation in the "right" or desired direction.

More specifically describing the invention, the motor shaft 1 is shown as journaled in bearings 2 and 3 in the stator core B and in the motor casing C, respectively; and the permanently magnetized rotor D is rigidly connected to the shaft with its poles magnetically coactive with the stator poles that are energized by the coil H so as to cause self-starting and rotation of the shaft in known manner in either a clockwise or a counter-clockwise direction depending upon the polarity of the line voltage at the instant power is applied through supply line wires J.

The shaft extends outwardly from the casing and is drivingly connected to apparatus to be driven, which for the purpose of explaining the principles of the invention is shown schematically as a known type of elapsed time hour meter and includes a drum type register F comprising a plurality of odometer wheels 4 rotatable on a shaft 5 secured with its axis perpendicular to the axis of the motor shaft in a frame G which is mounted on a stationary support here shown in the drawing as the motor casing, and transfer pinions 6 mounted on a shaft 6a.

The driving connection between the motor shaft and apparatus to be driven comprises gearing including a specially constructed worm 7 on the motor shaft meshing with a specially constructed gear 8 rotatable on the shaft 5. The side of the gear 8 has teeth 9 to coact with the first transfer pinion 6 which in turn actuates the first odometer wheel 4a and the other wheels are constructed and actuated in known manner.

The gear 8 may be any type of gear that will mesh with a worm, for example, a helical gear, or a worm gear, but is preferably a spiral gear. The gear is shown in mesh with the worm screw a portion of which is cutaway or omitted, or formed intermediate its length providing a flat abutment surface 10 in an axial plane of the worm or in plane parallel to and at one side of the worm axis when the worm is of small diameter; and the said spiral gear has one tooth 11 cut away or having an axial length less than the other teeth providing an abutment surface 12 on the inner end of the tooth approximately in an axial plane of the worm and intermediate the width or thickness of the gear. Desirably a plurality of the teeth, here three teeth, at one side of the abutment tooth 11, are made thinner than the other teeth as indicated at 13, 14, and 15 to permit play or looseness or back-lash with respect to the worm to prevent jamming of the worm and gear and allow the end 12 of the stop tooth 11 to properly abut the abutment surface 10 on the worm as hereinbelow described.

With this construction, the motor shaft and the worm and gear will rotate freely in the right or desired direction to drive the apparatus to be driven which in the present case is the register of the hour meter, but should the motor start to rotate in the opposite or wrong direction, the abutment surface 10 of the worm will strike, abut or contact the abutment surface 12 on the spiral gear tooth 11 as shown in the drawings, particularly FIGS. 3 and 4, so as to block or stop rotation in the second-mentioned or wrong direction, whereupon the rotor of the motor will rotate the shaft, worm and gear in the right or desired direction. The teeth 13, 14 and 15 providing for the back-lash are adjacent to each other with one immediately adjacent to the stop tooth and relieved at the sides thereof opposite the sides that coact with the worm screw in the driving of the gear in the forward or right direction, the other sides of the teeth having the normal contour for coaction with the worm screw to drive the gear in the right direction.

To facilitate assembly of the worm and gear so the gear will be properly positioned with respect to the abutment surface on the worm, the gear has an indicator boss 16 on its side opposite the teeth 9, the outer end of which is spaced from the relieved or narrow teeth, in the present instance at the sixth tooth from the third relieved tooth, and there is an indicator 17 such as a notch in the frame G, so that before the worm is placed in the assembly the gear may be rotated to aline the indicator boss with the notch and thereby dispose the stop tooth and relieved teeth in proper relation to the abutment surface 10 on the worm when the worm is moved into mesh with the gear.

I claim:

1. The combination with the shaft of a synchronous motor that is capable of starting in either direction, of a worm on said shaft to rotate therewith, and a gear rotatable about an axis perpendicular to the axis of said shaft and meshing with said worm providing upon energization of the motor for free rotation of the shaft and said gear in one direction, said worm and said gear having portions coactive to block rotation of the shaft in the opposite direction.

2. The combination according to claim 1 wherein said coactive portions are an abutment surface on the worm and a tooth on said gear having a stop surface to abut said abutment surface on the worm when the shaft starts to rotate in the second-mentioned direction and thereby stop rotation of the shaft in the second-mentioned direction.

3. The combination according to claim 1 wherein said coactive portions comprise a flat abutment surface on the worm intermediate the length thereof and in a plane approximately parallel to the worm axis, and a tooth on said gear which has a stop surface approximately in the plane of the worm axis to abut said abutment surface on the worm and thereby block rotation of the shaft in the second-mentioned direction.

4. The combination according to claim 1 with the addition of a driving connection between said gear and apparatus to be driven by the motor.

5. The combination according to claim 1 wherein said gear has means to drivingly coact with means on apparatus to be driven by the motor.

6. The combination according to claim 1 with the addition of apparatus including a rotatable part to be driven by the motor, and means to drivingly connect said gear to said rotatable part.

7. The combination according to claim 1 wherein said gear is a spiral gear.

8. The combination according to claim 2 wherein a plurality of the gear teeth at one side of said stop tooth adjacent to each other and with one immediately adjacent to the stop tooth are relieved at the sides thereof opposite the sides that coact with the worm to drive the gear in the right direction, providing play or backlash between the gear and the worm preventing jamming of the worm and the gear teeth and insuring proper engagement of the stop tooth and said abutment surface of the worm when the worm starts to rotate in the wrong direction.

\* \* \* \* \*